United States Patent
Choi et al.

(10) Patent No.: US 8,565,541 B2
(45) Date of Patent: Oct. 22, 2013

(54) IMAGE PROCESSING APPARATUS AND METHOD

(75) Inventors: Sungha Choi, Seoul (KR); Kyunggeun Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 291 days.

(21) Appl. No.: 12/972,194

(22) Filed: Dec. 17, 2010

(65) Prior Publication Data

US 2012/0027317 A1 Feb. 2, 2012

(30) Foreign Application Priority Data

Jul. 27, 2010 (KR) ........................ 10-2010-0072591

(51) Int. Cl.
*G06K 9/36* (2006.01)

(52) U.S. Cl.
USPC ........... 382/232; 382/244; 382/240; 382/239; 382/238

(58) Field of Classification Search
USPC .......................... 382/238, 239, 240, 244, 232
See application file for complete search history.

(56) References Cited

U.S. PATENT DOCUMENTS

| | | | |
|---|---|---|---|
| 6,438,165 B2 * | 8/2002 | Normile | 375/240 |
| 7,142,721 B2 * | 11/2006 | Chen et al. | 382/239 |
| 7,400,684 B2 | 7/2008 | Hannuksela et al. | |
| 7,460,131 B2 * | 12/2008 | Pan et al. | 345/600 |
| 7,711,052 B2 | 5/2010 | Hannuksela et al. | |
| 7,738,714 B2 | 6/2010 | Lee et al. | |
| 7,751,473 B2 | 7/2010 | Hannuksela | |
| 2001/0052861 A1 * | 12/2001 | Ohmura et al. | 340/988 |
| 2002/0136304 A1 * | 9/2002 | Akhan et al. | 375/240.16 |
| 2003/0002743 A1 * | 1/2003 | Ohta et al. | 382/239 |
| 2003/0223644 A1 * | 12/2003 | Park | 382/236 |
| 2004/0045030 A1 * | 3/2004 | Reynolds et al. | 725/110 |
| 2007/0140575 A1 * | 6/2007 | Bai et al. | 382/244 |
| 2007/0206681 A1 * | 9/2007 | Xin et al. | 375/240.24 |
| 2007/0242749 A1 * | 10/2007 | Sung | 375/240.16 |
| 2007/0274396 A1 * | 11/2007 | Zhang et al. | 375/240.24 |
| 2008/0025298 A1 * | 1/2008 | Lev-Ran et al. | 370/389 |
| 2008/0063063 A1 * | 3/2008 | Gelderblom et al. | 375/240.16 |
| 2009/0016624 A1 * | 1/2009 | Sung et al. | 382/238 |
| 2010/0042655 A1 * | 2/2010 | Tse et al. | 707/200 |
| 2010/0124380 A1 * | 5/2010 | Shiraishi et al. | 382/239 |
| 2010/0254622 A1 * | 10/2010 | Kamay et al. | 382/239 |
| 2011/0055087 A1 * | 3/2011 | Chen-Ritzo et al. | 705/80 |
| 2011/0178874 A1 * | 7/2011 | Ballout | 705/14.55 |

FOREIGN PATENT DOCUMENTS

| | | |
|---|---|---|
| KR | 10-2006-0060065 A | 6/2006 |
| KR | 10-2007-0032111 A | 3/2007 |
| KR | 10-2008-0083030 A | 9/2008 |

* cited by examiner

*Primary Examiner* — Stephen R Koziol
*Assistant Examiner* — Shaghayegh Azima
(74) *Attorney, Agent, or Firm* — Birch, Stewart, Kolasch & Birch, LLP

(57) ABSTRACT

An image processing apparatus and method capable of compressing a current image using one of a plurality of compression algorithms based upon similarity (or fluctuation level) between a previous image and the current image are discussed.

4 Claims, 6 Drawing Sheets

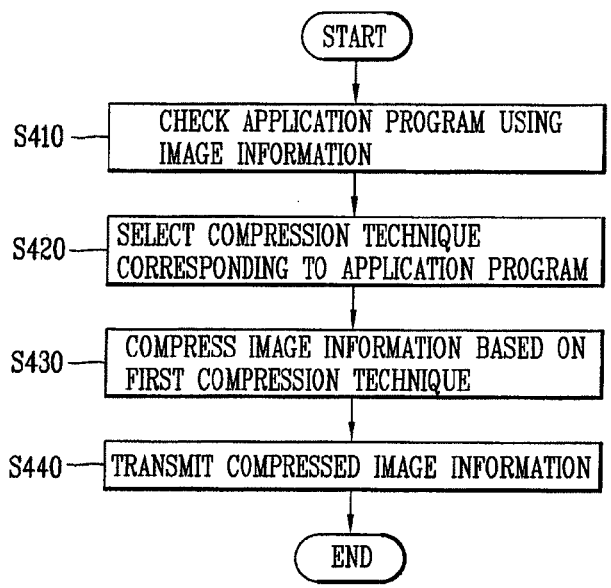
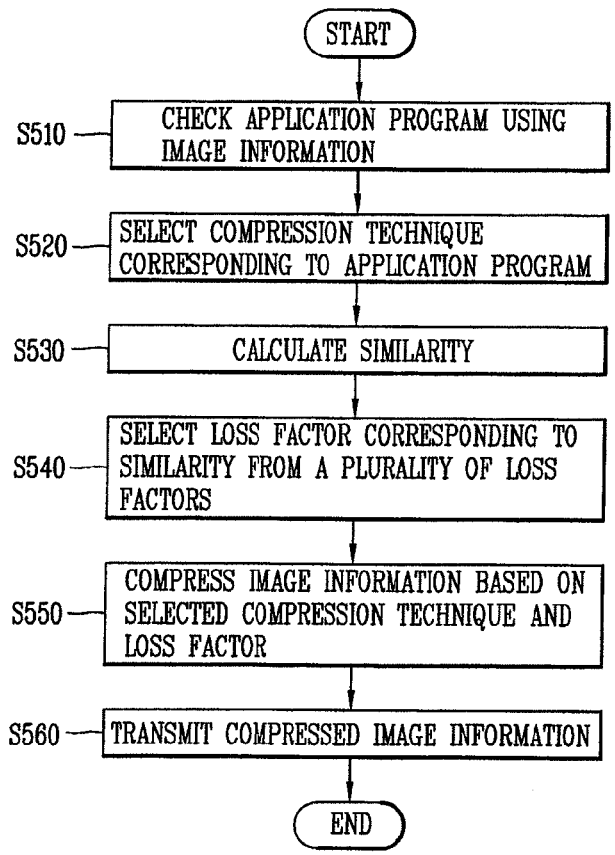

IMAGE PROCESSING APPARATUS AND METHOD

CROSS-REFERENCE TO RELATED APPLICATIONS

Pursuant to 35 U.S.C. §119(a), this application claims the benefit of earlier filing date and right of priority to Korean Application No. 10-2010-0072591, filed on Jul. 27, 2010, the contents of which is incorporated by reference herein in its entirety.

BACKGROUND OF THE INVENTION

1. Field of the Invention

Some exemplary embodiments of the present disclosure relate to an image processing apparatus and method.

2. Description of Related Art

In general, an image processing apparatus is to process a certain image received via a camera or the like, or a certain image received from an external terminal.

BRIEF SUMMARY OF THE INVENTION

Therefore, one aspect of the detailed description is to provide an image processing apparatus and method capable of compressing a current image (image information) using one of a plurality of compression algorithms (techniques) based upon similarity (fluctuation level) between a previous image and the current image.

Another aspect of the detailed description is to provide an image processing apparatus and method capable of controlling (setting) a loss factor or compression ratio of a specific compression algorithm based upon a preset loss factor or compression ratio corresponding to similarity (fluctuation level) between a previous image and a current image.

Another aspect of the detailed description is to provide an image processing apparatus and method capable of compressing an image based upon a compression algorithm selected according to an application program using the image and/or a loss factor selected in correspondence with similarity between a previous image and the current image.

Another aspect of the detailed description is to provide an image processing apparatus and method capable of compressing an image using a compression algorithm having the highest loss factor and transmitting the compressed image to an external terminal when a control signal is received from the external terminal communicatively connected.

Another aspect of the detailed description is to provide an image processing apparatus and method capable of compressing an image, to be transmitted to an external terminal, by increasing a loss factor of the image and transmitting the compressed image to the external terminal when a control signal is received from the external terminal communicatively connected.

According to one aspect of the present disclosure, there is provided an image processing method including calculating a similarity between a current image and a previous image, selecting a compression algorithm from a plurality of preset compression algorithms based upon the calculated similarity, and compressing the current image based upon the selected compression algorithm.

According to another aspect of the present disclosure, there is provided an image processing method including checking an application program, the program using an image, selecting a compression algorithm corresponding to the checked application program from a plurality of preset compression algorithms, and compressing the image based upon the selected compression algorithm.

According to another aspect of the present disclosure, there is provided an image processing method including receiving a control signal including touch input information, selecting a compression algorithm having the highest loss factor from a plurality of preset compression algorithms based upon the received control signal, compressing an image based upon the selected compression algorithm, and transmitting the compressed image to an external terminal.

According to another aspect of the present disclosure, there is provided an image processing method including receiving a control signal including touch input information, setting a loss factor of a specific compression algorithm to a preset maximum value based upon the received control signal, compressing an image based upon the compression algorithm with the set loss factor, and transmitting the compressed image to an external terminal.

According to another aspect of the present disclosure, there is provided an image processing apparatus including a storage unit configured to store a plurality of preset compression algorithms, and a controller configured to select a compression algorithm based upon similarity between a current image and a previous image from the plurality of compression algorithms, and compress the current image based upon the selected compression algorithm.

According to another aspect of the present disclosure, there is provided an processing apparatus including a storage unit configured to store a plurality of preset compression algorithms and a plurality of preset loss factors, and a controller configured to select a compression algorithm corresponding to an application program using an image from the plurality of compression algorithms, select a loss factor corresponding to the similarity from the plurality of loss factors, and compress the image based upon the selected loss factor and compression algorithm.

According to another aspect of the present disclosure, there is provided an image processing apparatus including a storage unit configured to store a plurality of preset compression algorithms, a communication unit configured to receive a control signal including touch input information, and a controller configured to select a compression algorithm having the highest loss factor from the plurality of compression algorithms based upon the received control signal, and compress an image based upon the selected compression algorithm.

According to another aspect of the present disclosure, there is provided an image processing apparatus including a storage unit configured to store a plurality of preset loss factors, a communication unit configured to receive a control signal including touch input information, and a controller configured to set a loss factor of a specific compression algorithm to a preset maximum value based upon the received control signal, and compress an image based upon the compression algorithm with the set loss factor.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 7 is a flowchart showing an image processing method in accordance with a fourth exemplary embodiment;

FIG. 8 is a flowchart showing an image processing method in accordance with a fifth exemplary embodiment;

DETAILED DESCRIPTION OF THE INVENTION

Description will now be given in detail of the preferred embodiments according to the present invention, with reference to the accompanying drawings. For the sake of brief description with reference to the drawings, the same or equivalent components will be provided with the same reference numbers, and description thereof will not be repeated.

Figure 1:
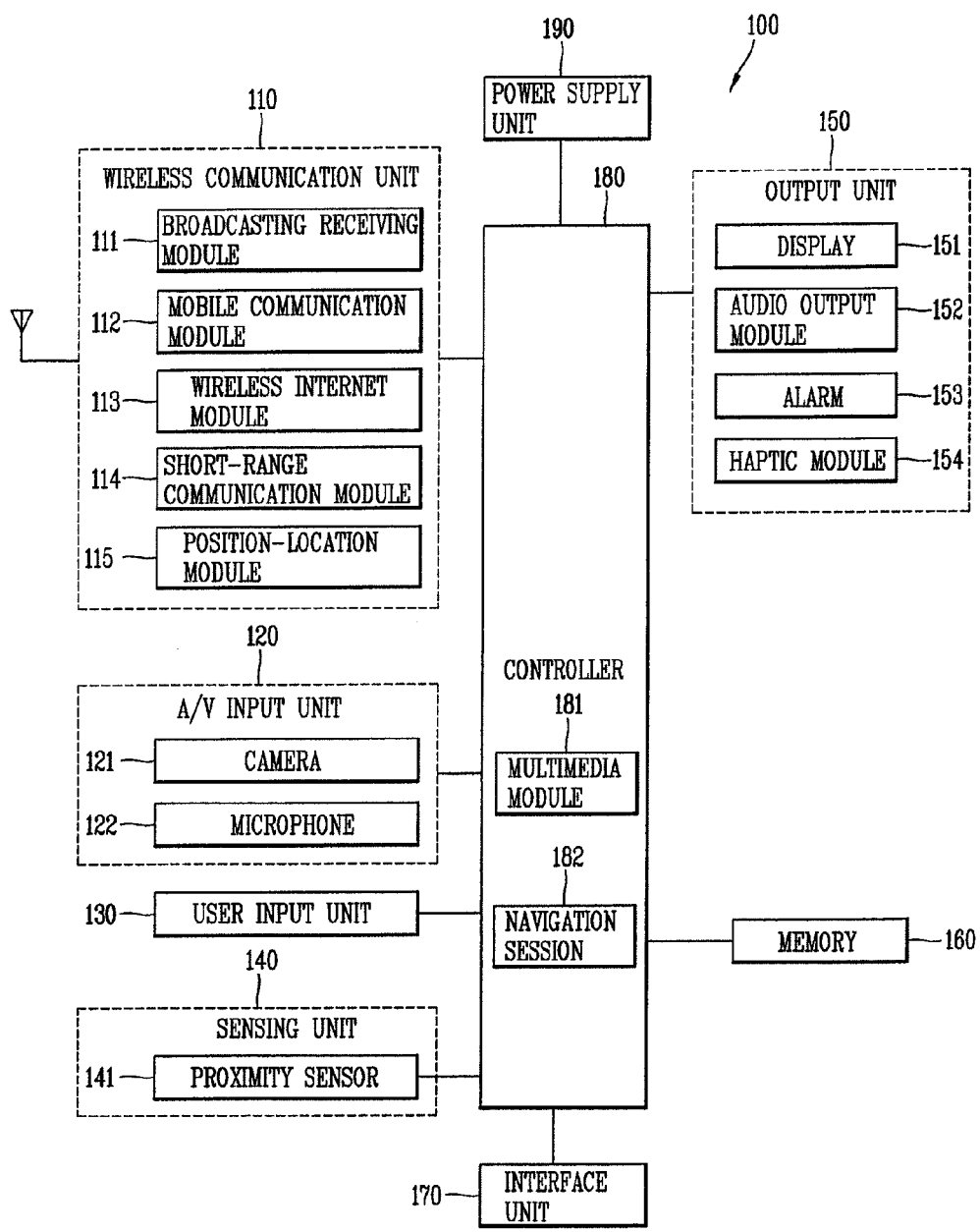
FIG. 1 is a block diagram showing a configuration of a mobile terminal for illustrating an image processing apparatus in accordance with an exemplary embodiment.

FIG. 1 is a block diagram showing a configuration of a mobile terminal (or mobile communication terminal) 100 for illustrating an image processing apparatus in accordance with one exemplary embodiment.

The mobile terminal 100 may be implemented in various forms such as mobile phones, smart phones, notebook computers, digital broadcast terminals, PDAs (Personal Digital Assistants), PMPs (Portable Multimedia Player), navigation systems, etc.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, a location information module 115, etc.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal (when the mobile terminal is located in a vehicle, the location of the vehicle can be checked). For example, the location information module 115 may include a GPS (Global positioning system) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi positioning system and/or hybrid positioning system may be used.

The A/V input unit 120 is configured to receive an audio or video signal. The A/V input unit 120 may include a camera 121 (or other image capture device) and a microphone 122 (or other sound pick-up device). The camera 121 processes image data of still pictures or video acquired by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data to control an operation of the mobile terminal 100. The user input unit 130 may include a keypad, a dome switch, a touch pad (pressure/capacitance), a jog wheel, a jog switch, and the like. Particularly, when the touch pad forms an interlayer structure together with a display unit 151, it may be called a touch screen.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication. When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

In some implementations, a display of the display unit 151 is configured to be transparent or light-transmissive to allow viewing of the exterior. A transparent display may be, for example, a TOLED (Transparent Organic Light Emitting Diode) display. Through such configuration, the user can view an object positioned at the rear side of the terminal body through the region occupied by the display unit 151 of the terminal body.

The mobile terminal 100 may include two or more display units 151 according to an implementation method thereof. For example, the mobile terminal 100 may include a plurality of display units integrally or separately disposed on one surface, or a plurality of display units disposed on different surfaces.

Meanwhile, when a sensor (referred to as a 'touch sensor', hereinafter) for detecting a touch operation of the display unit 151 is overlaid in a layered manner (referred to as a 'touch screen'), the display unit 151 may function as both an input device and an output device. The touch sensor may have, for example, the form of a touch film, a touch sheet, a touch pad, and the like.

The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input location and a touch input area. When there is a touch input with respect to the touch sensor, the corresponding signal(s) are sent to a touch controller. The touch controller processes the signal(s) and transmits corresponding data to the controller 180. Accordingly, the controller 180 can recognize a touched region of the display unit 151.

The proximity sensor 141 may be may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected based on a change in an electric field according to the approach of the pointer. In this case, the touch screen (touch sensor) may be classified as a proximity sensor.

Recognition of the pointer located to be close to the touch screen without being in contact with the touch screen will be called a 'proximity touch', while recognition of actual contacting of a pointer on the touch screen will be called a 'contact touch'. In this case, when the pointer is in the state of the proximity touch, it means that the pointer is located to correspond vertically to the touch screen.

The proximity sensor 141 may detect a proximity touch and a proximity touch pattern (e.g., a proximity touch distance, a proximity touch speed, a proximity touch time, a proximity touch location, a proximity touch movement state, or the like), and output information corresponding to the detected proximity touch operation and the proximity touch pattern to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a receiver, a speaker, a buzzer, etc.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (e.g., vibrations) to inform the user thereof. By providing such tactile outputs, the user can recognize the occurrence of various events. Outputs informing about the occurrence of an event may be also provided via the display unit 151 or the audio output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store programs used for the processing and controlling operations performed by the controller 180, or may temporarily store data (e.g., a phonebook, messages, still images, video, etc.) that is inputted or outputted. The memory 160 may store data relating to various types of vibrations and sounds outputted when touch input is performed on the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal therethrough. Various command signals or power inputted from the cradle may operate as signals for recognizing when the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images.

The power supply unit 190 receives external power or internal power and supplies appropriate power required for operating respective elements and components under control of the controller 180.

Processes described herein may be implemented in a computer-readable or its similar medium using, for example, software, hardware, or any combination thereof.

For hardware implementation, the processes may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such processes may be implemented by the controller 180 itself.

For software implementation, the processes, such as procedures or functions, may be implemented together with separate software modules that allow performing of at least one function or operation. Software codes can be implemented by a software application (or program) written in any suitable programming language. The software codes may be stored in the memory 160 and executed by the controller 180.

A navigation session 182 applied to the mobile terminal 100 provides a general navigation function.

In the meantime, the controller 180 of the mobile terminal 100 according to the exemplary embodiment may compress images (image frames, image information) using a compression algorithm (compression technique) and/or a loss factor selected based upon similarity between a previous image and a current image.

Also, the controller 180 of the mobile terminal 100 according to the exemplary embodiment may compress images (image frames, image information) based upon a compression algorithm (compression technique) selected according to an application program using images and/or a loss factor selected in correspondence with similarity between a previous image and the current image.

The controller 180 of the mobile terminal 100 according to the exemplary embodiment may also compress images (image frames, image information) using a compression algorithm (compression technique) having a high loss factor and/or a preset loss factor in case where a control signal is received from an external terminal communicatively connected thereto.

Figure 2:
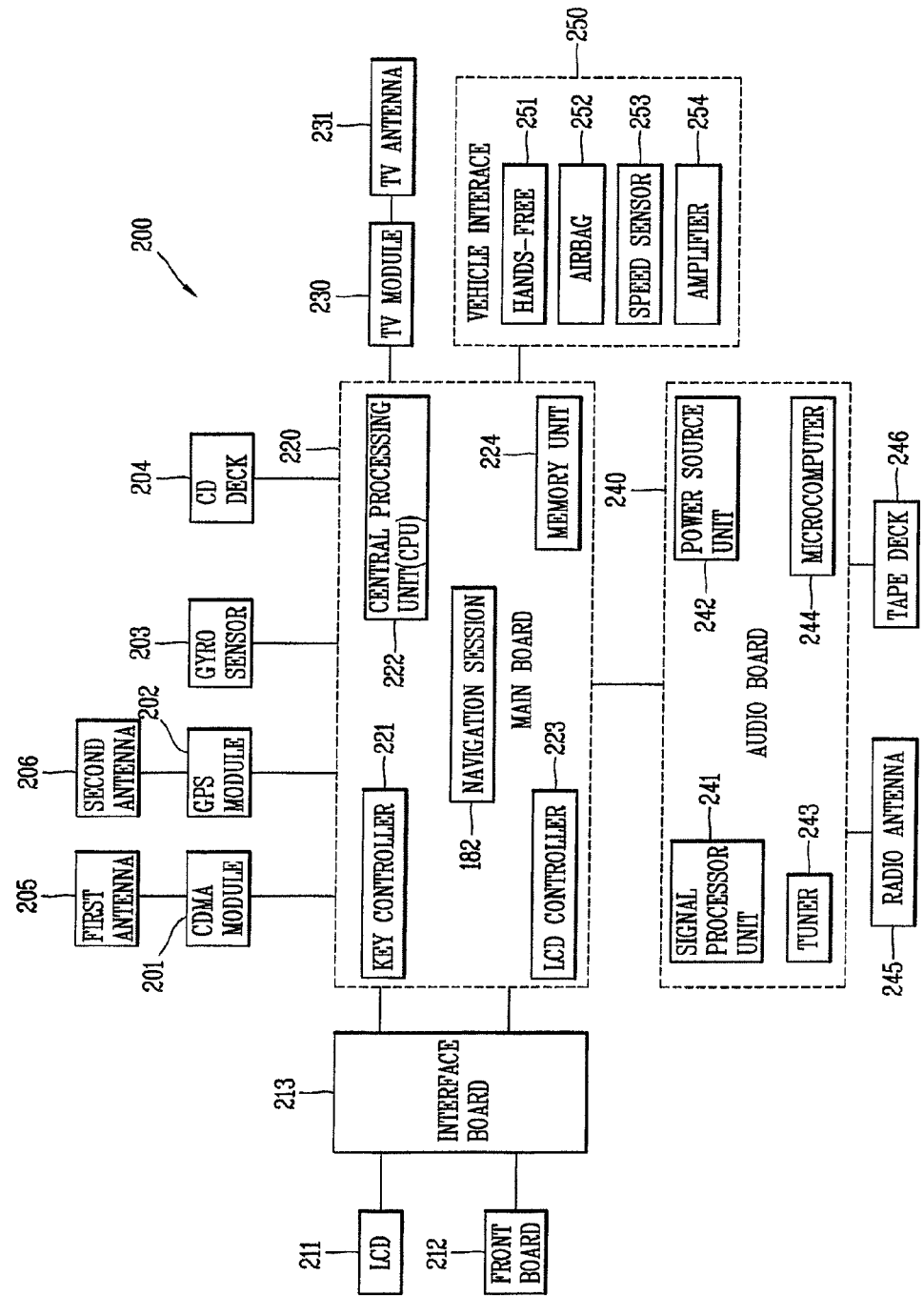
FIG. 2 is a block diagram showing a configuration of a telematics terminal for illustrating the image processing apparatus in accordance with the exemplary embodiment.

FIG. 2 is a block diagram showing a configuration of a telematics terminal for illustrating the image processing apparatus in accordance with the exemplary embodiment.

As shown, the telematics terminal 200 includes a Central Processing Unit (CPU) 222 for controlling the telematics terminal 200 overall, a key controller 221 for controlling various key signals, an LCD controller 223 for controlling an LCD, and a main board 220 having therein a memory 224 for storing various kinds of information.

The memory 224 stores map information (map data) for displaying road guidance information on a map of the display unit (or the LCD 211).

Also, the memory 224 stores a traffic information collecting control algorithm for inputting traffic information according to the situation of a road along which the vehicle currently travels (runs), and information for controlling the algorithm.

The main board 220 includes a communication module 201 assigned with a unique device number and performing a voice communication and data transmission/reception through a mobile terminal mounted in a vehicle, a GPS module 202 configured to guide a location of the vehicle, receive a GPS signal for tracking a travel route from a start point to a destination, generate data on a current position of the vehicle based on the received GPS signal, or transmit traffic information collected by a user as a GPS signal, a gyro sensor 203 configured to sense a running direction of the vehicle, a CD deck 204 configured to reproduce a signal recorded in a CD (Compact Disk), etc.

The communication module 201 and the GPS module 202 transmit and receive signals via a first antenna 205 and a second antenna 206, respectively.

The main board 220 is connected to a TV module 230 for receiving a broadcast signal via a broadcast signal antenna (or TV antenna) 231.

The main board 220 is connected to a liquid crystal display (LCD) 211 controlled by the LCD controller 223 via an interface board 213.

The LCD 211 processes a broadcasting signal received through the TV module 230 and then displays the processed broadcasting signal, in the form of a video signal, on the LCD 211 via the interface board 213 under control of the LCD controller 223. In addition, the LCD 211 outputs an audio signal through an amplifier 254 under control of an audio board 240 and displays each kind of video signal or text signal based on control signals of the LCD controller 223.

As discussed above, the LCD 211 may also be configured to receive an input from a user via a touch screen.

In addition, the main board 220 is connected to a front board 212 controlled by the key controller 221 via the interface board 213. The front board 212 configures buttons (or keys) and menus for enabling an input of a variety of key signals, and provides a key signal corresponding to the key (or button) selected by the user to the main board 220. The front board 212 may be provided with a menu key for allowing a direct input of traffic information, and the menu key may be configured to be controlled by the key controller 221.

The audio board 240 is connected with the main board 220 and processes various audio signals. The audio board 240 includes a microcomputer 244 for controlling the audio board 240, a tuner 243 for receiving a radio signal through an antenna (or radio antenna) 245, a power source unit 242 for supplying power to the microcomputer 244 and a signal processing unit 241 for processing various voice signals for output.

The audio board 240 also includes a radio antenna 245 for receiving a radio signal and a tape deck 246 for reproducing an audio tape.

The audio board 240 may further include an amplifier 254 for outputting a voice signal processed by the audio board 240.

The amplifier 254 is connected to a vehicle interface 250. Namely, the audio board 240 and the main board 220 are connected to the vehicle interface 250, respectively. A handsfree 251 for inputting a voice signal without using a driver's hand, an airbag 252 configured for the security of a passenger, a speed sensor 253 for detecting the speed of the vehicle, or the like, may be connected to the vehicle interface 250.

The speed sensor 253 calculates a vehicle speed and provides the calculated vehicle speed information to the CPU 222.

The navigation session 182 applied to the mobile terminal 200 provides a general navigation function.

The central processing unit 222 applied to the telematics terminal 200 according to the one exemplary embodiment may compress images (image frames, image information) using a compression algorithm (compression technique) and/or a loss factor selected based upon similarity between a previous image and a current image.

In addition, the central processing unit 222 applied to the telematics terminal 200 according to the one exemplary embodiment may compress images (image frames, image information) based upon a compression algorithm (compression technique) selected according to an application program using images and/or a loss factor selected in correspondence with similarity between a previous image and the current image.

Also, the central processing unit 222 applied to the telematics terminal 200 according to the one exemplary embodiment may compress images (image frames, image information) using a compression algorithm (compression technique) with a high loss factor and/or a preset loss factor upon reception of a control signal from an external terminal communicatively connected thereto.

Hereinafter, description will be given of a configuration of an image processing apparatus in accordance with an exemplary embodiment with reference to FIG. 3. Here, the image processing apparatus shown in FIG. 3 is applicable to various terminals such as smart phone, portable terminal, mobile terminal, personal digital assistant (PDA), notebook computer, WiBro terminal, Internet protocol television (IPTV) terminal, television, telematics terminal, navigation terminal, audio video navigation (AVN) terminal, and the like.

Figure 3:
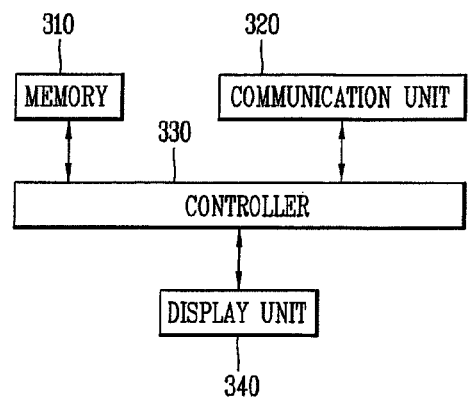
FIG. 3 is a block diagram showing a configuration of an image processing apparatus in accordance with an exemplary embodiment.

FIG. 3 is a block diagram showing a configuration of an image processing apparatus in accordance with an exemplary embodiment. As shown in FIG. 3, the image processing apparatus 300 may include a storage unit (memory) 310, a communication unit 320 and a controller 330. FIG. 3 shows the image processing apparatus 300 having various components, but it is understood that implementing all of the illustrated components is not a requirement. The image processing apparatus 300 may alternatively implemented by greater or fewer components.

The storage unit 310 may store various menu screens, various user interfaces (UIs) and/or graphic user interfaces (GUIs) and the like.

In addition, the storage unit 310 may store images (image information) received from external terminals, images (image information) received via a camera (not shown) or the like. Here, the images (image information) may include still images and/or videos.

The storage unit 310 may also store a plurality of compression algorithms (compression techniques). Here, examples of the compression algorithms may include standard compression algorithms proposed by International Standardization Organization (ISO)/International Electro-technical Commission (IEC), ITU Telecommunication standardization Sector (ITU-T), Consultative Committee International Telegraph and Telephone (CCITT) and the like. The standard compression algorithms may include, for example, Joint Photography Experts Group (JPEG), JPEG 2000, Joint Bi-level Image Experts Group (JBIG), JBIG2, Dejavu (DjVu), fractal compression, ICER, Progressive Graphics File (PGF), wavelet compression, S3 Texture Compression (S3TC), lossless JPEG, Portable Network Graphics (PNG), BitMap (BMP), WBMP, PC Paintbrush Exchange (PCX), Truevision TGA (TGA), Tagged Image File Format (TIFF), Graphics Interchange Format (GIF), Active Streaming Format (ASF), Audio Video Interleaving (AVI), MJPEG, motion JPEG, moving Picture Experts Group (MPEG)-1, MPEG-2, MPEG-4, H.261, H.262, H.263, H.264, Ogg Theora, Dirac and the like.

Also, the storage unit 310, as shown in Table 1, may set priorities of the plurality of compression algorithms. Here, the setting of the priority for each compression algorithm may be achieved in various manners depending on designers.

TABLE 1

| Priority | Compression algorithm |
|---|---|
| 0 | JPEG |
| 1 | JPEG 2000 |
| 2 | JBIG |
| 3 | JBIG2 |
| 4 | DjVu |
| 5 | Fractal compression |
| 6 | ICER |
| 7 | PGF(progressive graphics file) |
| 8 | Wavelet compression |
| 9 | S3TC(S3 texture compression) |

In addition, the storage unit 310, as shown in Table 2, may set similarities with respect to the plurality of compression algorithms. Here, upon setting the similarity for each compression algorithm, a compression algorithm having a high loss factor or taking a short compression time may be set when similarity is low, and a compression algorithm having a low loss factor or taking a long compression time may be set when similarity is high. The setting of the similarity for each compression algorithm may be achieved in various manners depending on designers.

TABLE 2

| Similarity | Compression algorithm |
|---|---|
| More than 99% | Lossless compression |
| 90%~99% | JPEG |
| 80%~90% | JPEG 2000 |
| 70%~80% | JBIG |
| 60%~70% | JBIG2 |
| ... | ... |

The storage unit 310, as shown in Table 3, may also set a loss factor (or a loss level) for similarities.

TABLE 3

| Similarity | Loss factor (or Compression level) |
|---|---|
| More than 99% | 0 (Compression level: 0) |
| 90%~99% | 10 (Compression level: 1) |
| 80%~90% | 30 (Compression level: 2) |
| 70%~80% | 50 (Compression level: 3) |
| 60%~70% | 70 (Compression level: 4) |

The storage unit 310 may store data and programs needed for operations of the image processing apparatus 300.

The storage unit 310 may include at least one type of non-transitory storage medium including a flash memory type, a hard disk type, a multimedia card micro type, a card-type memory (e.g., SD or DX memory, etc), a Read-Only Memory (ROM), an Electrically Erasable Programmable Read-Only Memory (EEPROM), a Programmable Read-Only Memory (PROM), a Random Access Memory (RAM), a Static Random Access Memory (SRAM), magnetic memory, a magnetic disk, an optical disk, and the like.

The communication unit 320 may include a wireless internet module or a short-range communication module. Here, the wireless internet module may include Wireless WLAN, Wi-FI, Wibro, Wimax, HSDPA, and the like. The short-range communication module may include BLUETOOTH, RFID, IrDA, UWB, ZigBee, and the like.

The communication unit 320 may perform call functions with random wired/wireless terminals. Here, the call functions may include a data communication function, a voice communication function, a video/image conference/call function, a messaging function and the like.

In addition, the communication unit 320 may transmit compressed images to random wired/wireless terminals. The communication unit 320 may also receive a control signal sent from a random wired/wireless terminal.

The controller 330 may control an overall operation of the image processing apparatus 300. The controller 330 may also resize an image (image information) (or video, video information) or an image frame (or a video frame), and compress (or encode) the resized image (video). Also, the controller 330 may calculate similarity between a current image and a previous image. Here, the similarity between the images may indicate a fluctuation (change) level (for example, a quantity of change in RGB value, a quantity of change in YCbCr value, etc.) of pixel data between certain consecutive frames.

The controller 330 may encode or decode an image (image information) and/or voice (audio) (voice/audio information) using one of a plurality of codes previously stored in the storage unit 310. That is, the controller 330 may include an encoder/decoder (not shown).

Also, when the calculated similarity between the images is higher than a preset threshold value, the controller 330 may select a first compression algorithm from a plurality of compression algorithms (for example, one of lossless compression algorithms) preset in the storage unit 310, and compress the current image using the selected first compression algorithm. Here, the controller 330 may select a compression algorithm having a good image quality and a low compression ratio (or a compression algorithm having a low loss factor or taking a relatively longer compression time), based upon a high similarity between the current image and previous image.

Also, when the calculated similarity between the images is higher than the preset threshold value, the controller 330 may select a compression algorithm having a priority one level higher than that of a compression algorithm, which was used upon compression of the previous image, and compress the current image using the selected compression algorithm.

As one example, when the calculated similarity between the images is higher than the preset threshold value and the previous image has been compressed by JPEG 2000, the controller 330 selects a JPEG compression algorithm whose priority is one level higher than that of the JPEG 2000, with reference to the above Table 1, and compresses the image using the selected JPEG.

Also, when the calculated similarity between the images is lower than or equal to the preset threshold value, the controller 330 selects a second compression algorithm from the plurality of compression algorithms (for example, one of lossy compression algorithms) stored in the storage unit 310, and compresses the current image using the selected second compression algorithm. Here, the controller 330 may select a compression algorithm having a bad image quality and a high compression ratio (or a compression algorithm having a high loss factor or taking a relatively short compression time), based upon the low similarity between the current image and the previous image.

When the similarity between the current image and the previous image is lower than or equal to the preset threshold value, the controller 330 may select a compression algorithm having a priority one level lower than that of a compression algorithm, which was used upon compression of the previous image, and compress the current image using the selected compression algorithm.

As one example, when the calculated similarity between the images is lower than or equal to the preset threshold value and the previous image was compressed by JPEG 2000, the controller 330 selects JBIG compression whose priority is one level lower than that of the JPEG 2000, with reference to the above Table 1, and compresses the image using the selected JBIG.

In addition, the controller 330 may select a compression algorithm corresponding to the calculated similarity between the images, among similarities corresponding to the plurality of preset compression algorithms stored in the storage unit 310, and then compress the current image using the selected compression algorithm. Here, the controller 330 may select a compression algorithm supporting a high image quality and a low compression ratio when the similarity is high, while selecting a compression algorithm supporting a relatively low image quality and a high compression ratio when the similarity is low.

As one example, when the images show 97% of similarity therebetween according to the calculation result, the controller 330 selects JPEG compression algorithm corresponding to the 83% similarity with reference to the above Table 2, and compresses the image using the selected JPEG.

The controller 330 selects a loss factor corresponding to the calculated similarity between the images from similarities in correspondence with the plurality of loss factors (compression ratios, loss levels or compression levels) preset in the storage unit 310, and sets a loss factor of a compression algorithm based upon the selected loss factor. Also, the controller compresses the current image using the compression method having the set loss factor. Here, the controller 330 selects a compression algorithm having a high image quality and a low compression ratio when the similarity is high, while selecting a compression algorithm having a relatively low image quality and a high compression ratio when the similarity is low.

As one example, when the two images have 83% similarity therebetween according to the calculation result, the controller 330 select a loss factor '30' corresponding to the 83% similarity and sets a loss factor of JPEG as a preset compression algorithm to the selected loss factor '30' so as to compress the image using the JPEG compression having the loss factor set to '30.'

The controller 330 may also check an application program using certain images. The controller 330 selects a compression algorithm corresponding to the checked application program, from a plurality of compression algorithms preset (stored) in the storage unit 310, and compresses the current image using the selected compression algorithm. That is, for a certain image, when a fluctuation (change) level of the image (or pixel data) is low (or when the similarity between adjacent images is high), the controller 330 compresses the image using a compression algorithm with a low loss factor, and when the fluctuation level of the image (or pixel data) is high (or when the similarity between adjacent images is low), the controller 330 compresses the image using a compression algorithm with a high loss factor.

In addition, the controller 330 may select a compression algorithm corresponding to the checked application program, from the plurality of compression algorithms preset (stored) in the storage unit 310. Also, the controller 330 may select a loss factor corresponding to the calculated similarity between the images among similarities corresponding to a plurality of loss factors preset in the storage unit 310, and set a loss factor of the selected compression algorithm based upon the selected loss factor. The controller 330 may then compress the current image using the compression algorithm having the preset loss factor.

The controller 330 may select a compression algorithm with the highest loss factor from a plurality of compression algorithms preset in the storage unit 310 based upon a control signal (i.e., a control signal sent from an external terminal) received via the communication unit 320, and compress the current image using the selected compression algorithm with the highest loss factor. Here, the control signal may include information which informs a reception of a certain input (for example, a touch input or the like) made by an external terminal, in order to optimize (or reduce) a switching time (or a response time) of an image displayed on the external terminal upon performing a control corresponding to the received input.

The controller 330 may then select a preset value (for example, a maximum value) among a plurality of loss factors preset in the storage unit 310 based upon the control signal sent by the external terminal via the communication unit 320, and set a loss factor of a certain compression algorithm based upon the selected value. The controller 330 may accordingly compress the current image using the compression algorithm with the set loss factor.

The controller 330 may control the communication unit 320 to send the compressed image to a specific terminal connected via the communication unit 320. The controller 330 may perform a certain signal processing (for example, decoding/encoding) for the received image from the external terminal or via a camera or the like, and display the signal-processed image on the display unit 340. Here, the image may include still image and/or video. In addition, when the image received from the external terminal is an image which has been resized into a certain size, the controller 330 may then decode the resized image to the original sized image and display the decoded image on the display 340.

When a touch input is made by a user in the state that the image received from the external terminal is displayed on the display unit 340, the controller 340 may send a control signal (including information related to the touch input) to the external terminal via the communication unit 320 for fast switching from the currently displayed image to the next image.

The controller 330 may then receive information (including the image) sent by the external terminal in response to the control signal, via the communication unit 320, and perform a certain signal processing (for example, decoding/encoding) for the received information, thereby displaying the signal-processed information on the display unit 340.

As such, with the configuration of the image processing apparatus 300, under a state where image information (or image) sent by an external terminal in real time is displayed on the display unit 340, in case where switching from a currently displayed image to the next image is needed in response to a user's touch input or the like, upon reception of the user touch input, a control signal is sent to the external terminal to receive an image (image information) with a high loss factor (for example, an image with a relatively low image quality and a high loss factor), sent from the external terminal, in response to the sent control signal, thereby reducing a response time taken for image switching.

The display unit 340 may display various contents, such as a variety of menu screens and the like, by using user interfaces and/or graphic user interfaces stored in the storage unit 310 under control of the controller 330. Here, the contents displayed on the display unit 340 may include various text or image data (including a variety of information data) and menu screens including icons, list menus, combo boxes and the like.

Also, the display unit 340 may display such compressed image thereon under control of the controller 330. The display unit 340 may display an image received via the communication unit 320 under control of the controller 330. The display unit 340 may be implemented using at least one of display technologies including, for example, a liquid crystal display (LCD), a thin film transistor-liquid crystal display (TFT-LCD), an organic light-emitting diode display (OLED), a flexible display and a three-dimensional display. Also, the display unit 340 may be implemented in two or more in number according to a configured aspect of the image processing apparatus 300. For instance, a plurality of the display units may be arranged on one surface (the same surface) of the image processing apparatus 300 in a spacing manner or in an integrated manner, or may be arranged on different surfaces thereof.

Meanwhile, if the display unit 340 and a touch sensitive sensor (referred to as a touch sensor) have a layered structure therebetween (referred to as 'touch screen'), the display unit 340 may be used as an input device rather than an output device. The touch sensor may be implemented as a touch film, a touch sheet, a touch pad, a touch panel and the like.

The touch sensor may be configured to convert changes of a pressure applied to a specific part of the display unit 340, or a capacitance occurring from a specific part of the display unit 340, into electric input signals. Also, the touch sensor may be configured to sense not only a touched position and a touched area, but also a touch pressure. When touch inputs are sensed by the touch sensor, corresponding signals are transmitted to a touch controller (not shown). The touch controller processes the received signals, and then transmits corresponding data to the controller 330. Accordingly, the controller 330 may sense which region of the display unit 340 has been touched.

The display unit 340 may include a proximity sensor. The proximity sensor may be arranged at an inner region of the image processing apparatus 300 covered by the touch screen, or near the touch screen.

The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utilization degree than a contact sensor.

Examples of the proximity sensor may include a transmissive type photoelectric sensor, a direct reflective type photoelectric sensor, a mirror reflective type photoelectric sensor, a high-frequency oscillation type proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, a status that the pointer is positioned to be proximate onto the touch screen without contact will be referred to as 'proximity touch', whereas a status that the pointer substantially comes in contact with the touch screen will be referred to as 'contact touch'. When the pointer is positioned in a status of 'proximity touch,' the position corresponds to a position to be vertical with respect to the touch screen.

The proximity sensor senses proximity touch, and proximity touch patterns (e.g., distance, direction, speed, time, position, moving status, etc.). Information relating to the sensed proximity touch, and the sensed proximity touch patterns may be output onto the touch screen.

As such, when the display unit 340 is used as an input device, the display unit 340 is allowed to receive a user's button manipulation or receive a command or control signal input by a manipulation, such as touching/scrolling a displayed screen.

The image processing apparatus 300 may further include an input unit (not shown) for receiving a signal in response to a user's button manipulation or a specific function selection, or receiving a command or control signal generated in response to a manipulation, such as touching/scrolling a displayed screen.

The input unit may receive a signal corresponding to information input by a user and be implemented by using various devices, such as keypad, touch screen, jog wheel, mouse, stylus pen, touch pen and the like. The input unit may include a microphone (not shown) and/or a camera (not shown), and receive audio information and/or video information (or image information) via the microphone and/or camera.

The image processing apparatus 300 may further include an audio output unit (not shown) for outputting audio information included in a signal, which has been signal-processed under control of the controller 330. Here, the audio output unit may be a speaker.

The audio output unit may output audio information when a voice call function, video/image conference/call function or the like is performed under control of the controller 330.

Figure 4:
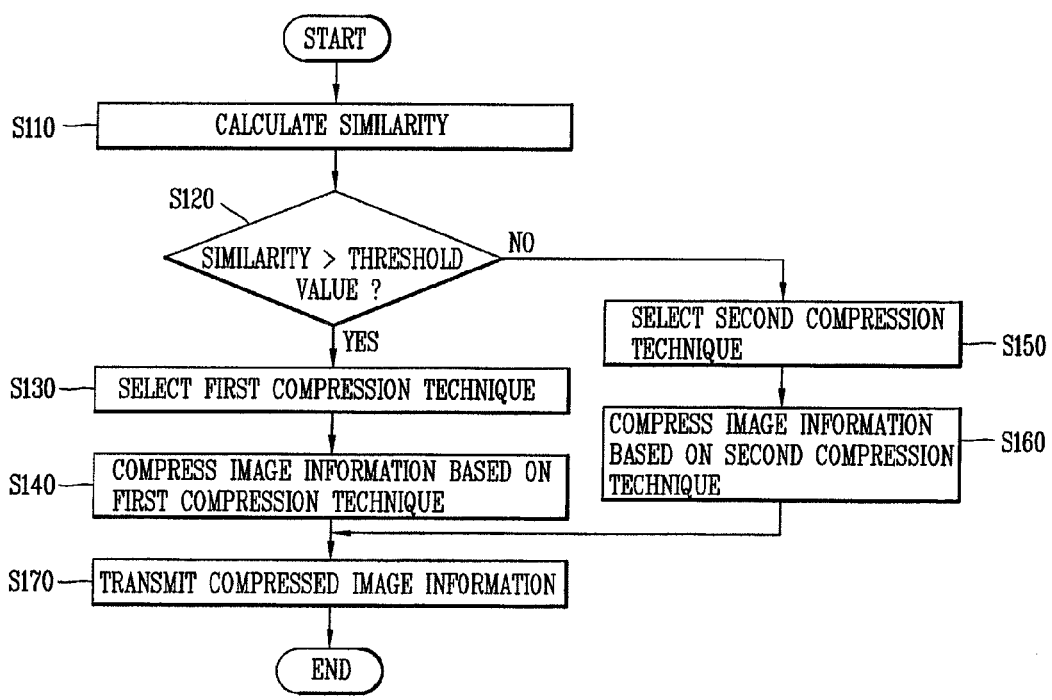
FIG. 4 is a flowchart showing an image processing method in accordance with a first exemplary embodiment.

FIG. 4 is a flowchart showing an image processing method in accordance with a first exemplary embodiment.

First, the controller 330 calculates a similarity between a current image (image/video information or video/image frame) and a previous image (or a quantity of change in pixel data between consecutive frames) (S110). Afterwards, the controller 330 compares the calculated similarity between the current image and the previous image with a preset threshold value (S120). According to the comparison result, if the similarity is higher than the preset threshold value, the controller 330 selects a first compression algorithm (compression technique) from a plurality of compression algorithms preset in the storage unit 310.

As one example, if the similarity is higher than the preset threshold value, the controller 330 selects a lossless compression algorithm (TIFF or GIF compression algorithm) as a preset compression algorithm from the plurality of compression algorithms (for example, a lossy compression algorithm (including JPEG) and the lossless compression algorithm (including TIFF or GIF compression algorithm using LZW), which are preset in the storage unit 310.

As another example, when the similarity is higher than the preset threshold value, the controller 330 selects a compression algorithm (for example, JPEG) having a priority one level higher than a compression algorithm (for example JPEG 2000) used upon compression of the previous image, from the plurality of compression algorithms respectively having preset priorities as shown in Table 1.

As another example, when the similarity is higher than the preset threshold value, the controller 330 selects a first compression algorithm from the plurality of compression algorithms preset in the storage unit 310 (S130). Afterwards, the controller 330 compresses (or encodes/decodes) the current image using the selected first compression algorithm.

As one example, the controller 330 compresses the current image using TIFF or GIF as the selected lossless compression algorithm. As another example, the controller 330 compresses the current image using the JPEG compression algorithm. As another example, the controller 330 compresses the current image using the selected first compression algorithm. Here, the current image may be an image in an original size (S140).

On the contrary, if the similarity is lower than or equal to the preset threshold value according to the comparison result, the controller 330 selects a second compression algorithm used upon compression of the previous image, or a second compression algorithm from the plurality of compression algorithms stored in the storage unit 310.

As one example, when the similarity is lower than or equal to the preset threshold value, the controller 330 selects the lossy compression algorithm as a preset compression algorithm from the plurality of compression algorithms (for example, the lossy compression algorithm (including JPEG) and the lossless compression algorithm (including TIFF or GIF compression algorithm using LZW), which are preset in the storage unit 310.

As another example, if the similarity is lower than or equal to the preset threshold value, the controller 330 selects a compression algorithm (for example, JBIG) having a priority one level lower than a compression algorithm (for example, JPEG 2000) used upon compression of the previous image, from the plurality of compression algorithms respectively having preset priorities as shown in Table 1.

As another example, if the similarity is lower than or equal to the preset threshold value, the controller 330 selects a second compression algorithm (for example, PGF) used upon compression of the previous image.

As another example, if the similarity is lower than or equal to the preset threshold value, the controller 330 selects a second compression algorithm from the plurality of compression algorithms preset in the storage unit 310 (S150). Afterwards, the controller 330 compresses the current image using the selected second compression algorithm. As one example, the controller 330 compresses the current image using JPEG as the selected lossy compression algorithm. As another example, the controller 330 compresses the current image using JBIG as the selected compression algorithm. As another example, the controller 330 compresses the current image using the selected second compression algorithm. Here, the current image may be an image obtained by resizing an original sized image (or a size-reduced image) (S160). Afterwards, the controller 330 controls the communication unit 320 to transmit the compressed image to a specific terminal communicatively connected thereto (S170).

As such, the image processing apparatus 300 may be configured to select a compression algorithm based upon similarity and compress an image using the selected compression algorithm.

Figure 5:
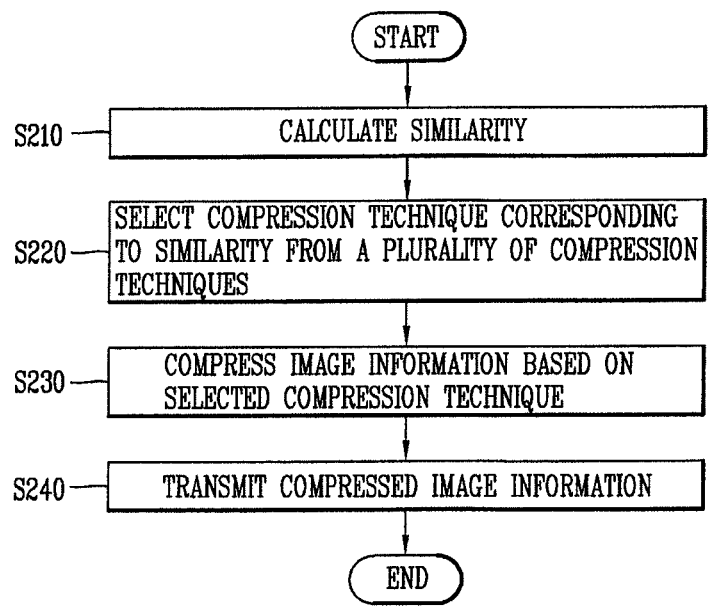
FIG. 5 is a flowchart showing an image processing method in accordance with a second exemplary embodiment.

FIG. 5 is a flowchart showing an image processing method in accordance with a second exemplary embodiment.

First, the controller 330 calculates a similarity between a current image (image/video information or image/video frame) with a previous image (S210). Afterwards, the controller 330 selects a compression algorithm corresponding to the calculated similarity between the current image and the previous image from a plurality of compression algorithms preset in the storage unit 310. Here, the plurality of compression algorithms may correspond to respectively values each corresponding to a similarity for each compression algorithm.

As one example, if the calculated similarity is 90%, the controller 330 selects JPEG as a compression algorithm corresponding to the calculated 97% similarity (S220). Afterwards, the controller 330 compresses the current image using the selected compression algorithm. As one example, the controller 330 compresses the current image using JPEG as the selected compression algorithm.

Also, if any preset compression algorithm corresponding to the calculated similarity is not found, the controller 300 may compress the current image using a default compression algorithm (S230). The controller 330 then controls the communication unit 320 to transmit the compressed image to a specific terminal communicatively connected thereto (S240).

As such, the image processing apparatus 300 may be configured to select a compression algorithm corresponding to similarity and compress an image using the selected compression algorithm.

Figure 6:
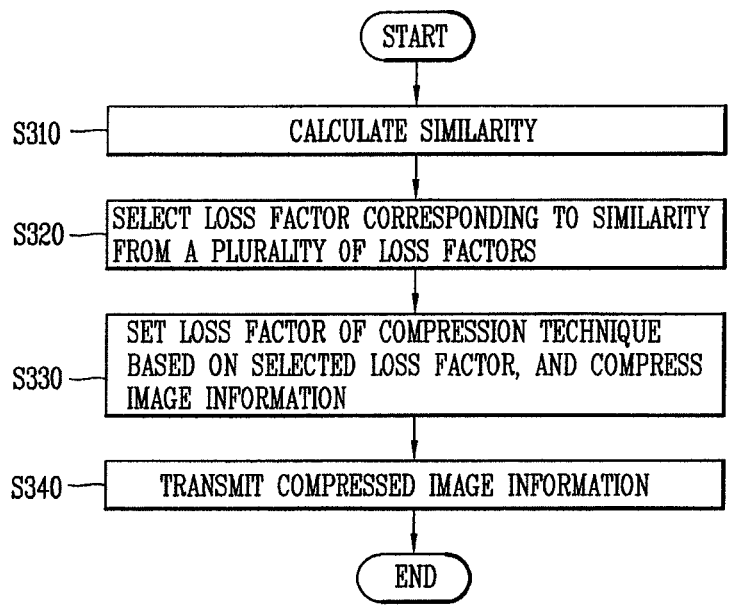
FIG. 6 is a flowchart showing an image processing method in accordance with a third exemplary embodiment.

FIG. 6 is a flowchart showing an image processing method in accordance with a third exemplary embodiment.

First, the controller 330 calculates a similarity between a current image (image/video information or image/video frame) with a previous image (S310). Afterwards, the controller 330 selects (or checks) a loss factor (compression ratio, loss/compression level, etc.) corresponding to the calculated similarity between the current image and the previous image from a plurality of loss factors (compression ratios or loss/compression levels) preset in the storage unit 310. Here, the preset loss factors may correspond to values (or ranges) corresponding to similarities.

As one example, in relation to a compression algorithm (for example, JPEG) preset in the storage unit 310, if the relation between similarity and loss factor is as shown in Table 2 and the calculated similarity is 83%, the controller 330 selects a loss factor '30' corresponding to the 83% similarity (S320).

Afterwards, the controller 330 sets a loss factor of the preset compression algorithm based upon the selected loss factor, and compresses the current image using the compression algorithm having the set loss factor.

As one example, the controller 330 sets the loss factor of the preset JPEG compression algorithm to '30' and compresses the current image using the JPEG compression whose loss factor is set to '30.'

The controller 330 may also compress the current image using a default loss factor if any loss factor is not set in correspondence with the calculated similarity (S330). The controller 330 then controls the communication unit 320 to transmit the compressed image to a specific terminal communicatively connected thereto (S340). As such, the image processing apparatus 300 may be configured to compress an image by setting a loss factor of a preset compression algorithm based upon a loss factor corresponding to similarity.

FIG. 7 is a flowchart showing an image processing method in accordance with a fourth exemplary embodiment. First, the controller 330 checks a type of an application program using a specific image. As one example, the controller 330 checks a navigation application program using specific map data. As another example, the controller 330 checks a window media player program displaying video (video information) (S410). Afterwards, the controller 330 selects a compression algorithm corresponding to the checked application program from a plurality of compression algorithms preset in the storage unit 310.

As one example, the controller 330 selects TIFF as a lossless compression algorithm corresponding to the checked navigation application program from the plurality of compression algorithms in the storage unit 310. Here, the navigation application program uses the TIFF compression as a loss factor-minimized compression algorithm upon compressing data because there are not many changes in pixel data.

As another example, the controller 330 selects MPEG-4 compression corresponding to the checked window media player program from the plurality of compression algorithms in the storage unit 310. Here, the window media player program uses the MPEG-4 compression as a compression algorithm having a loss factor upon compressing data because there are many changes in pixel data (S420).

Afterwards, the controller 330 compresses the image using the selected compression algorithm. As one example, the controller 330 compresses the current image using the selected TIFF compression. As another example, the controller 330 compresses the current image using the selected MPEG-4 compression. Also, the controller 330 may compress the image using a default compression algorithm if any preset compression algorithm is not present in correspondence with the image (S430).

The controller 330 then controls the communication 320 to transmit the compressed image to a specific terminal communicatively connected thereto (S4400). As such, the image processing apparatus 300 may select a compression algorithm efficient for a specific application program from a plurality of compression algorithms, and compress the image using the selected compression algorithm.

FIG. 8 is a flowchart showing an image processing method in accordance with a fifth exemplary embodiment.

First, the controller 330 checks a type of an application program using a specific image. As one example, the controller 330 checks a navigation application program using certain map data. As another example, the controller 330 checks a window media player program displaying a certain video (moving picture) (S510). Afterwards, the controller 330 selects a compression algorithm corresponding to the checked application program from the plurality of compression algorithms in the storage unit 310. As one example, the controller 330 selects TIFF as the lossless compression algorithm corresponding to the checked navigation application program from the plurality of compression algorithms in the storage unit 310. As another example, the controller 330 selects MPEG-4 compression corresponding to the checked window media player program from the plurality of compression algorithms in the storage unit 310 (S520). Afterwards, the controller 330 calculates similarity between a current image (image/video information or image/video frame) and a previous image (S530).

The controller 330 then selects a loss factor corresponding to the calculated similarity between the current image and the previous image from a plurality of loss factors (compression ratios or loss/compression levels) preset in the storage unit 310. Here, the loss factors of the preset compression algorithms respectively correspond to values (or ranges) corresponding to similarities (S540). Afterwards, the controller 330 compresses the current image based upon the selected compression algorithm and the selected loss factor. As one example, the controller 330 sets a loss factor of the selected TIFF compression to '10,' as a loss factor value selected in correspondence with the similarity, and then compresses the current image using the TIFF compression having the loss factor set to '10.'

As another example, the controller 330 sets a loss factor of the selected MPEG-4 compression to '50,' as a loss factor selected in correspondence with the similarity, and then compresses the current image using the MPEG-4 compression having the loss factor set to '50.'

Also, the controller 330 may compress the image using a default compression algorithm or loss factor if any preset compression algorithm corresponding to the image or any preset loss factor corresponding to the calculated similarity is not found (S550).

Afterwards, the controller 330 controls the communication unit 320 to transmit the compressed image to a specific terminal communicatively connected thereto (S560).

As such, the image processing apparatus 300 may compress an image using a compression algorithm selected in correspondence with a specific application program and a loss factor selected in correspondence with similarity.

Figure 9:
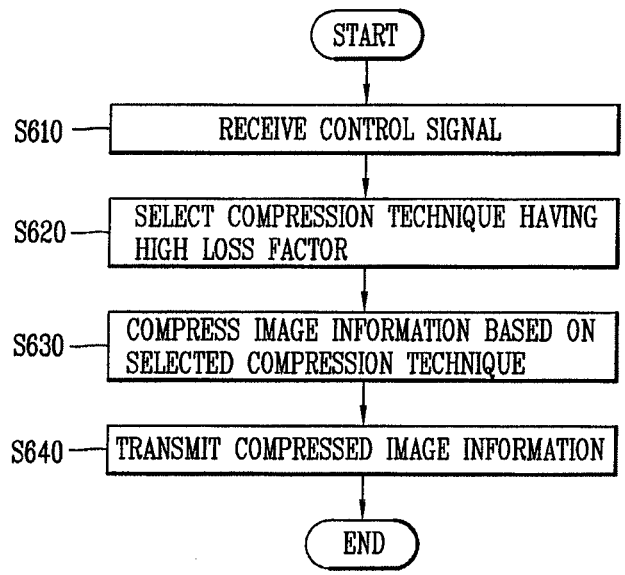
FIG. 9 is a flowchart showing an image processing method in accordance with a sixth exemplary embodiment.

FIG. 9 is a flowchart showing an image processing method in accordance with a sixth exemplary embodiment.

First, the communication unit 320 receives a control signal sent from a specific terminal communicatively connected in a wired or wireless manner. Here, the control signal may include user input information (for example, touch input or the like) received from the specific terminal (S610).

The controller 330 selects a compression algorithm having the highest loss factor from a plurality of compression algorithms preset in the storage unit 310 based upon the received control signal (S620). Afterwards, the controller 330 compresses a current image using the selected compression algorithm having the highest loss factor (S630). The controller 330 then controls the communication unit 320 to transmit the compressed image to the particular terminal (S640). As such, the image processing apparatus 300 may compress an image using a compression algorithm having the highest loss factor when a control signal is received from an external terminal communicatively connected thereto, and then transmit the compressed image to the external terminal. Therefore, the external terminal may reduce a response time taken for switching to the next image (or screen) in response to a certain control.

Figure 10:
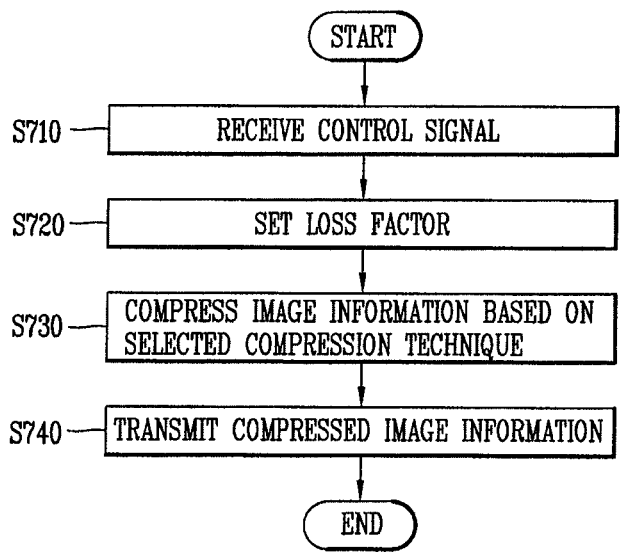
FIG. 10 is a flowchart showing an image processing method in accordance with a seventh exemplary embodiment.

FIG. 10 is a flowchart showing an image processing method in accordance with a seventh exemplary embodiment. First, the communication unit 320 receives a control signal sent by a specific terminal communicatively connected in a wired or wireless manner. Here, the control signal may include user input information (for example, touch input or the like) received from the specific terminal (S710).

Afterwards, the controller 330 sets a loss factor (compression ratio or loss/compression level) of a specific compression algorithm to a preset value (for example, maximum value) based upon the received control signal (S720). The controller 330 then compresses a current image using the specific compression algorithm based upon the set loss factor thereof (S730). The controller 330 then controls the communication unit 320 to transmit the compressed image to the specific terminal (S740).

As such, the image processing apparatus 300 may compress an image to be transmitted to an external terminal communicatively connected thereto by increasing a loss factor of the corresponding image, when receiving a control signal from the external terminal, and transmit the compressed image to the external terminal. Therefore, the external terminal may reduce a response time taken for switching to the next image (or screen) in response to a certain control.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An image processing method comprising:
    calculating a similarity between a current image and a previous image;
    selecting a compression algorithm from a plurality of preset compression algorithms based upon the calculated similarity; and
    compressing the current image based upon the selected compression algorithm,
    wherein the selecting of the compression algorithm comprises:
        comparing the calculated similarity with a preset threshold value;
        providing preset compression algorithms organized by levels, each subsequent level having a higher loss factor;
        selecting a compression algorithm having a priority one level higher than that of a compression algorithm used upon compression of the previous image, from a plurality of compression algorithms each having a preset priority, when the calculated similarity is higher than the threshold value; and
        selecting a compression algorithm having a priority one level lower than that of a compression algorithm used upon compression of the previous image, from the plurality of compression algorithms each having the preset priority, when the calculated similarity is lower than or equal to the threshold value.

2. The method of claim 1, wherein the selecting of the compression algorithm comprises selecting a compression algorithm corresponding to the calculated similarity from the plurality of preset compression algorithms.

3. An image processing apparatus comprising:
    a storage unit configured to store a plurality of preset compression algorithms;
    a controller configured to select a compression algorithm based upon similarity between a current image and a previous image from the plurality of compression algorithms, and compress the current image based upon the selected compression algorithm; and
    preset compression algorithms organized by levels, each subsequent level having a higher loss factor,
    wherein the controller is configured to select a compression algorithm having a priority one level higher than a compression algorithm used upon compression of the previous image, when the similarity is higher than the preset threshold value.

4. An image processing apparatus comprising:
    a storage unit configured to store a plurality of preset compression algorithms;
    a controller configured to select a compression algorithm based upon similarity between a current image and a previous image from the plurality of compression algorithms, and compress the current image based upon the selected compression algorithm; and
    preset compression algorithms organized by levels, each subsequent level having a higher loss factor,
    wherein the controller is configured to select a compression algorithm having a priority one level lower than a compression algorithm used upon compression of the previous image, when the similarity is lower than or equal to the preset threshold value.

* * * * *